US012649561B2

(12) United States Patent
Araki et al.

(10) Patent No.: US 12,649,561 B2
(45) Date of Patent: Jun. 9, 2026

(54) PERSONAL WATERCRAFT

(71) Applicant: Kawasaki Motors, Ltd., Hyogo (JP)

(72) Inventors: Toshio Araki, Akashi (JP); Yuki Nakamura, Akashi (JP)

(73) Assignee: KAWASAKI MOTORS, LTD., Hyogo (JP)

( * ) Notice: Subject to any disclaimer, the term of this patent is extended or adjusted under 35 U.S.C. 154(b) by 936 days.

(21) Appl. No.: 17/859,018

(22) Filed: Jul. 7, 2022

(65) Prior Publication Data

US 2024/0009602 A1    Jan. 11, 2024

(51) Int. Cl.
| | |
|---|---|
| *B63H 21/38* | (2006.01) |
| *B01D 29/56* | (2006.01) |
| *B01D 35/143* | (2006.01) |
| *B63B 11/00* | (2006.01) |
| *B63B 34/10* | (2020.01) |
| *B63B 35/32* | (2006.01) |
| *B63H 11/00* | (2006.01) |
| *B63H 11/08* | (2006.01) |

(Continued)

(52) U.S. Cl.
CPC ............. *B63H 21/38* (2013.01); *B01D 29/56* (2013.01); *B01D 35/1435* (2013.01); *B63B 34/10* (2020.02); *B63B 35/32* (2013.01); *B63H 11/08* (2013.01); *B63B 11/00* (2013.01); *B63H 2011/004* (2013.01); *B63H 21/24* (2013.01); *F01P 3/202* (2013.01); *F01P 2050/02* (2013.01)

(58) Field of Classification Search
CPC .... B01D 35/1435; B01D 29/56; B01D 35/30; B01D 46/2411; B01D 2201/30; B01D 2201/29; B63B 11/00; B63B 34/10; B63B 35/32; B63B 1/04; B63B 17/00; B63B 2035/006; B63B 2035/007; B63H 11/08; B63J 4/002

USPC ....................................................... 114/55.57
See application file for complete search history.

(56) References Cited

U.S. PATENT DOCUMENTS

| | | | | |
|---|---|---|---|---|
| 5,472,359 A | * | 12/1995 | Allbright, Jr. ......... | B63H 11/08 |
| | | | | 440/88 M |
| 6,171,158 B1 | * | 1/2001 | Henmi ................. | B63H 21/383 |
| | | | | 440/89 C |

(Continued)

FOREIGN PATENT DOCUMENTS

| | | | | | |
|---|---|---|---|---|---|
| CN | | 203706376 U | * | 7/2014 | |
| CN | | 109018221 A | * | 12/2018 | ............. B63B 35/32 |

(Continued)

OTHER PUBLICATIONS

CN-109018221-A image and text (Year: 2018).*
CN-203706376-U image and text (Year: 2014).*

*Primary Examiner* — S. Joseph Morano
*Assistant Examiner* — Eric Anthony Starck
(74) *Attorney, Agent, or Firm* — XSENSUS LLP

(57) ABSTRACT

A personal watercraft includes a ship body and a recovery water passage. The ship body includes a deck and a hull. The recovery water passage is provided in the hull, and includes a water intake opening through which water can be taken in when the ship body plains on a water surface, and a discharge opening through which the taken water is discharged. The recovery water passage is formed with a filter accommodation space that accommodates a filter that traps minute foreign matters contained in water flowing through the recovery water passage.

16 Claims, 13 Drawing Sheets

(51) Int. Cl.
    *B63H 21/00*       (2006.01)
    *F01P 3/20*        (2006.01)

(56)                   References Cited

U.S. PATENT DOCUMENTS

| | | | | |
|---|---|---|---|---|
| 6,192,823 | B1 * | 2/2001 | Tsumiyama | B63B 27/143 |
| | | | | 114/55.5 |
| 6,685,517 | B2 * | 2/2004 | Matsuda | B63B 34/10 |
| | | | | 440/88 J |
| 6,881,109 | B2 * | 4/2005 | Matsuda | B63H 11/08 |
| | | | | 440/88 M |
| 2002/0182949 | A1 * | 12/2002 | Tanaka | B63H 21/383 |
| | | | | 440/88 M |
| 2021/0001970 | A1 * | 1/2021 | Ito | E02B 15/04 |
| 2021/0380213 | A1 | 12/2021 | Watanabe et al. | |

FOREIGN PATENT DOCUMENTS

| | | | | | |
|---|---|---|---|---|---|
| GB | 2388184 A | * | 11/2003 | | F01P 3/18 |
| JP | 2021-191652 A | | 12/2021 | | |

* cited by examiner

FRONT

REAR

UP

DOWN

FIG.12

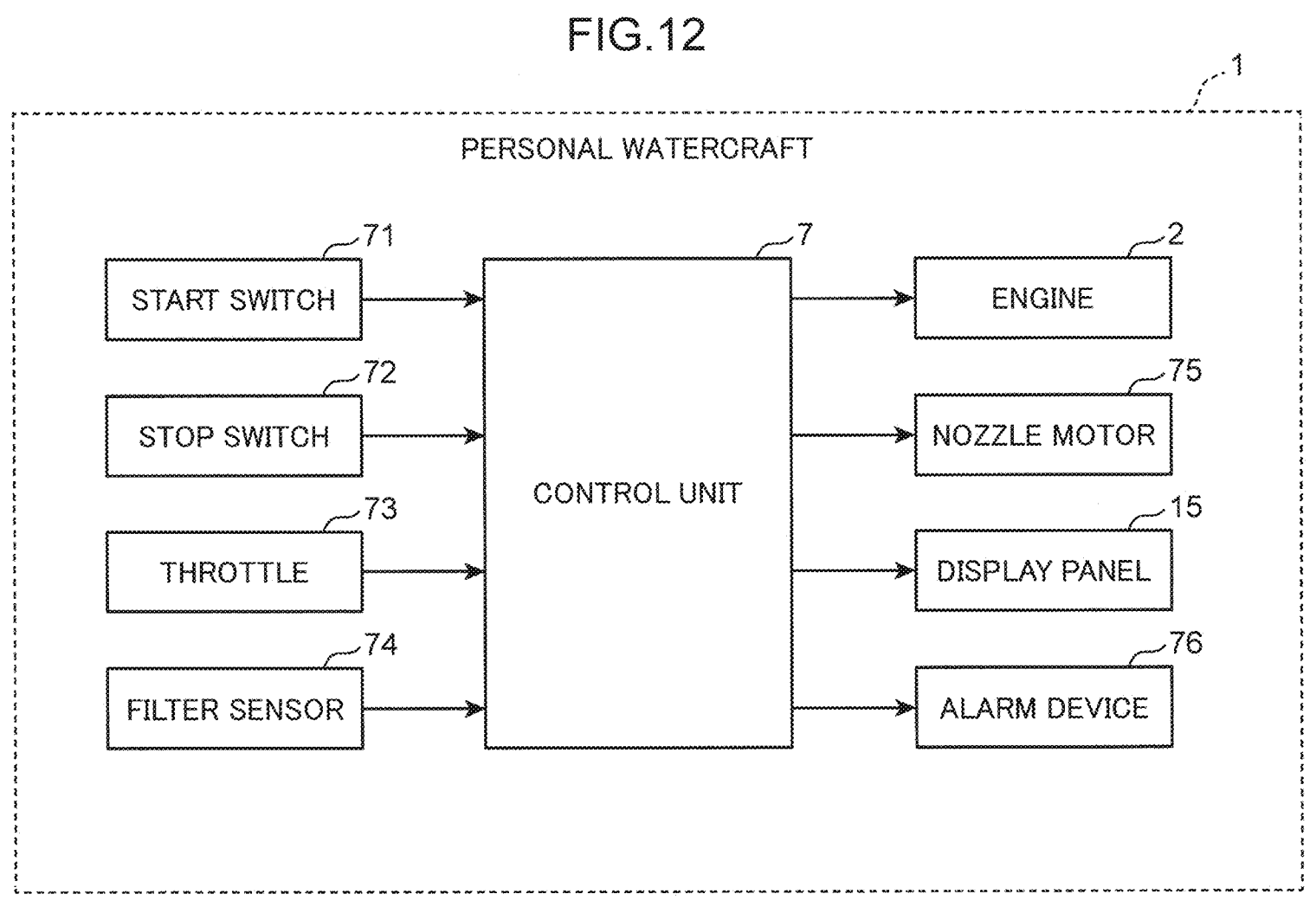

PERSONAL WATERCRAFT

CONTROL UNIT

ENGINE

NOZZLE MOTOR

DISPLAY PANEL

ALARM DEVICE

START SWITCH

STOP SWITCH

THROTTLE

FILTER SENSOR

PERSONAL WATERCRAFT

BACKGROUND

Technical Field

The present disclosure relates to a personal watercraft.

Background Art

JP2021-191652A discloses disposing a filter for filtering residual foreign matters in water in a cooling water path of an engine unit that drives an outboard motor. If the filter is clogged with residual foreign matters, the cleanup performance is deteriorated.

SUMMARY

An object of the present disclosure is to provide a personal watercraft that can contribute to marine environment cleanup while suppressing deterioration in cleanup performance.

A personal watercraft according to an aspect of the present disclosure includes: a ship body including a deck and a hull; and a recovery water passage provided in the hull and having a water intake opening through which water can be taken in when the ship body planes on a water surface and a discharge opening through which taken water is discharged. The recovery water passage is formed with a filter accommodation space that accommodates a filter that traps minute foreign matters contained in water flowing through the recovery water passage.

BRIEF DESCRIPTION OF THE DRAWINGS

FIG. 12 is a block diagram illustrating an example of an electrical configuration of the personal watercraft.

DETAILED DESCRIPTION

Various embodiments of a personal watercraft 1 according to the present disclosure will be described below with reference to the drawings. Throughout this specification, a reference number may appear in multiple drawings but may only be described with respect to one of the drawings. Some drawings are given direction indication of front, rear, left, and right, and these directions coincide with directions viewed from a driver on the personal watercraft 1. In the embodiments described below, an example will be described in which the personal watercraft 1 is a jet propulsion type personal watercraft that navigates on water in reaction to water flow jetted rearward. The personal watercraft 1 may be a personal watercraft other than the jet propulsion type. In recent years, there is a problem of marine plastic waste as one of focused environmental problems. In particular, it is concerned that microplastics having a size of 5 mm or less float in the sea without being naturally decomposed, and adversely affect not only marine organisms but also human bodies. A jet propulsion type personal watercraft goes forward by pressurizing and accelerating water taken in from a water suction port provided in a bottom surface of a ship body by a jet pump including an impeller and injecting the water rearward. That is, the jet propulsion type personal watercraft sucks a large amount of water and vigorously discharges the water to get a propulsive force. In such a personal watercraft that uses a large amount of water, it is desirable to make some contribution to the marine environmental problems. Hereinafter, various embodiments of a personal watercraft capable of contributing to marine environmental cleanup and suppressing deterioration in cleanup performance will be described.

First Embodiment

Figure 1:
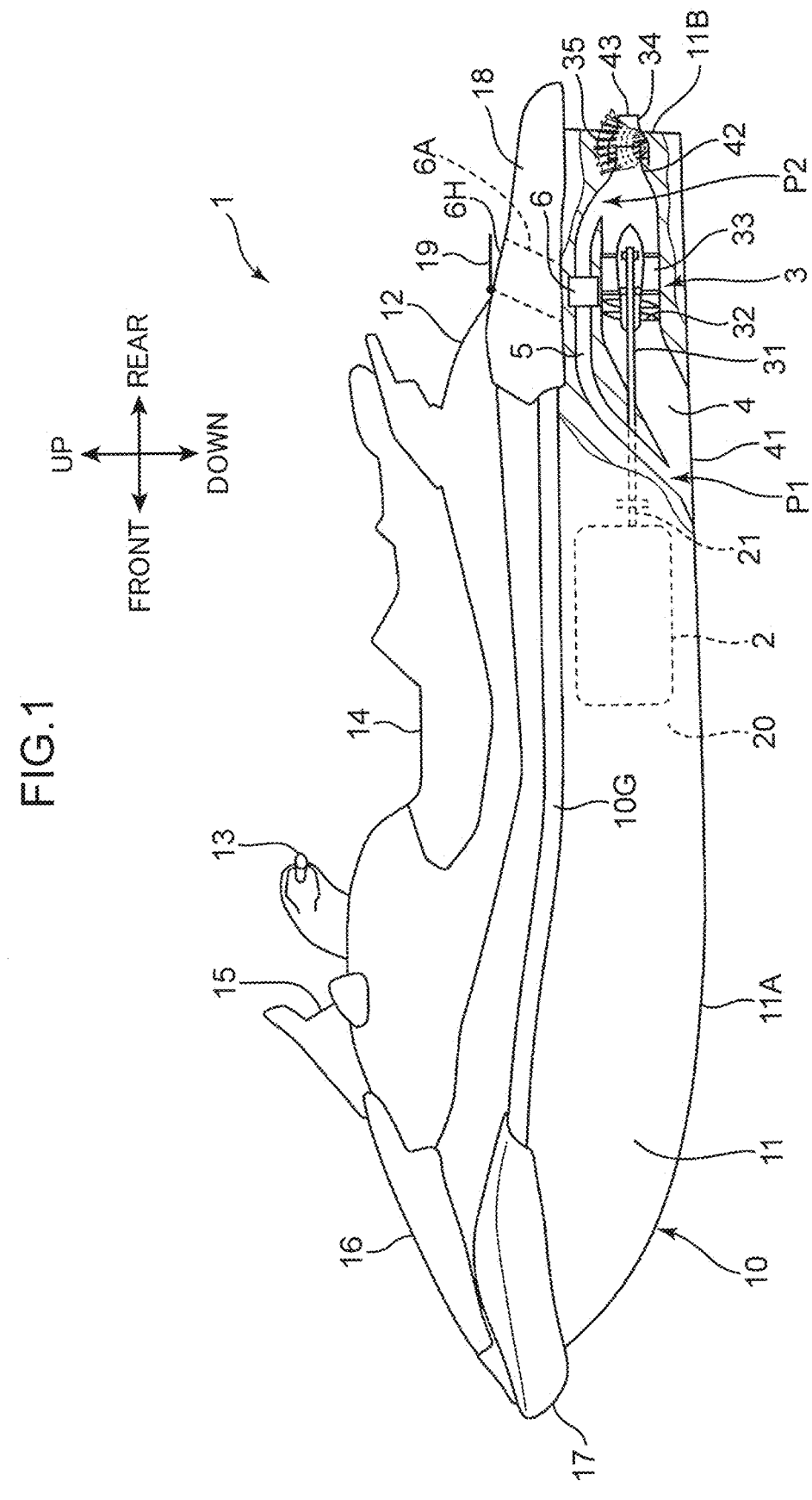
FIG. 1 is a partially broken side view of a personal watercraft including a recovery water passage according to a first embodiment of the present disclosure.
Figure 2:
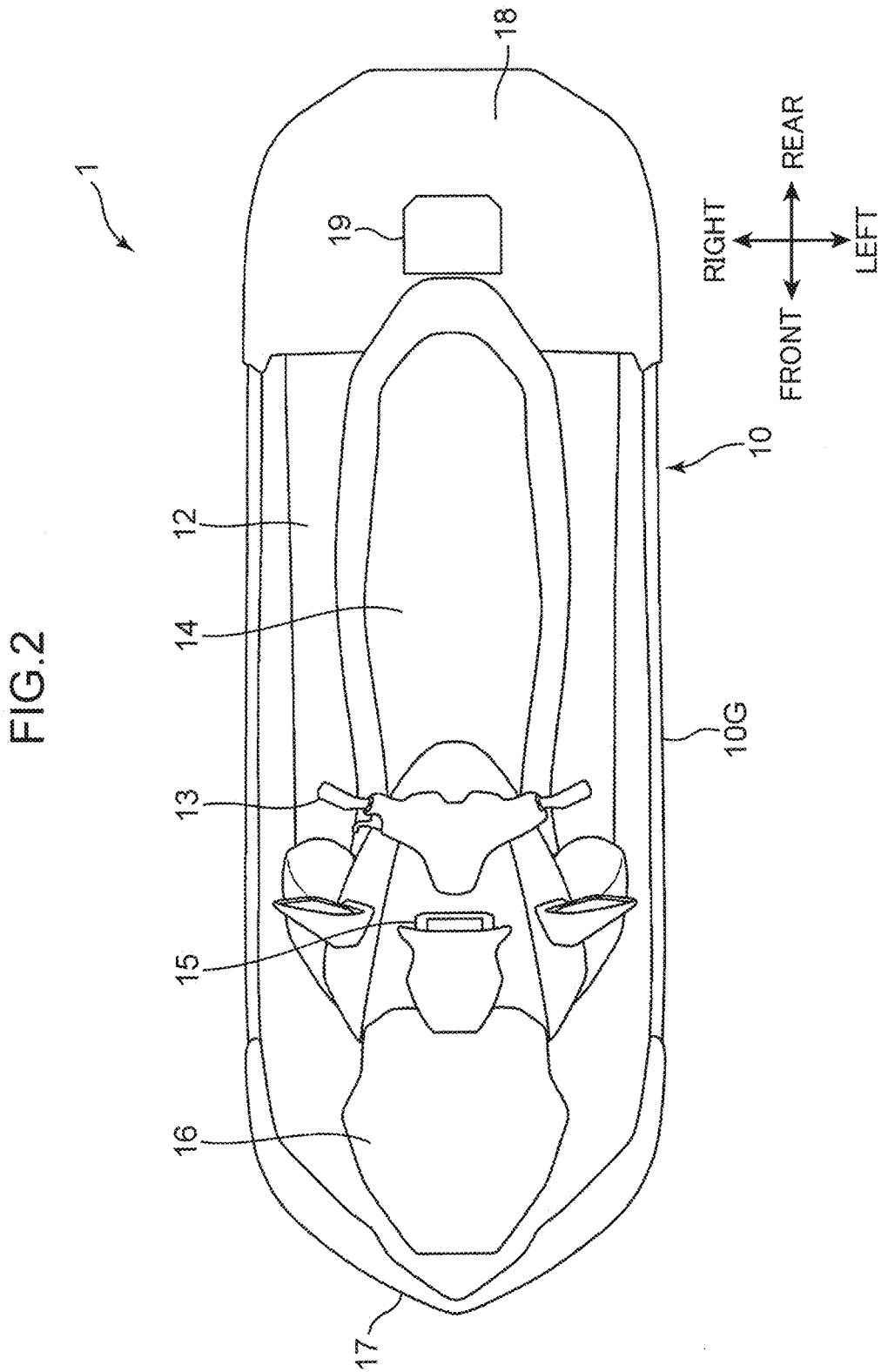
FIG. 2 is a top view of the personal watercraft.
Figure 3:
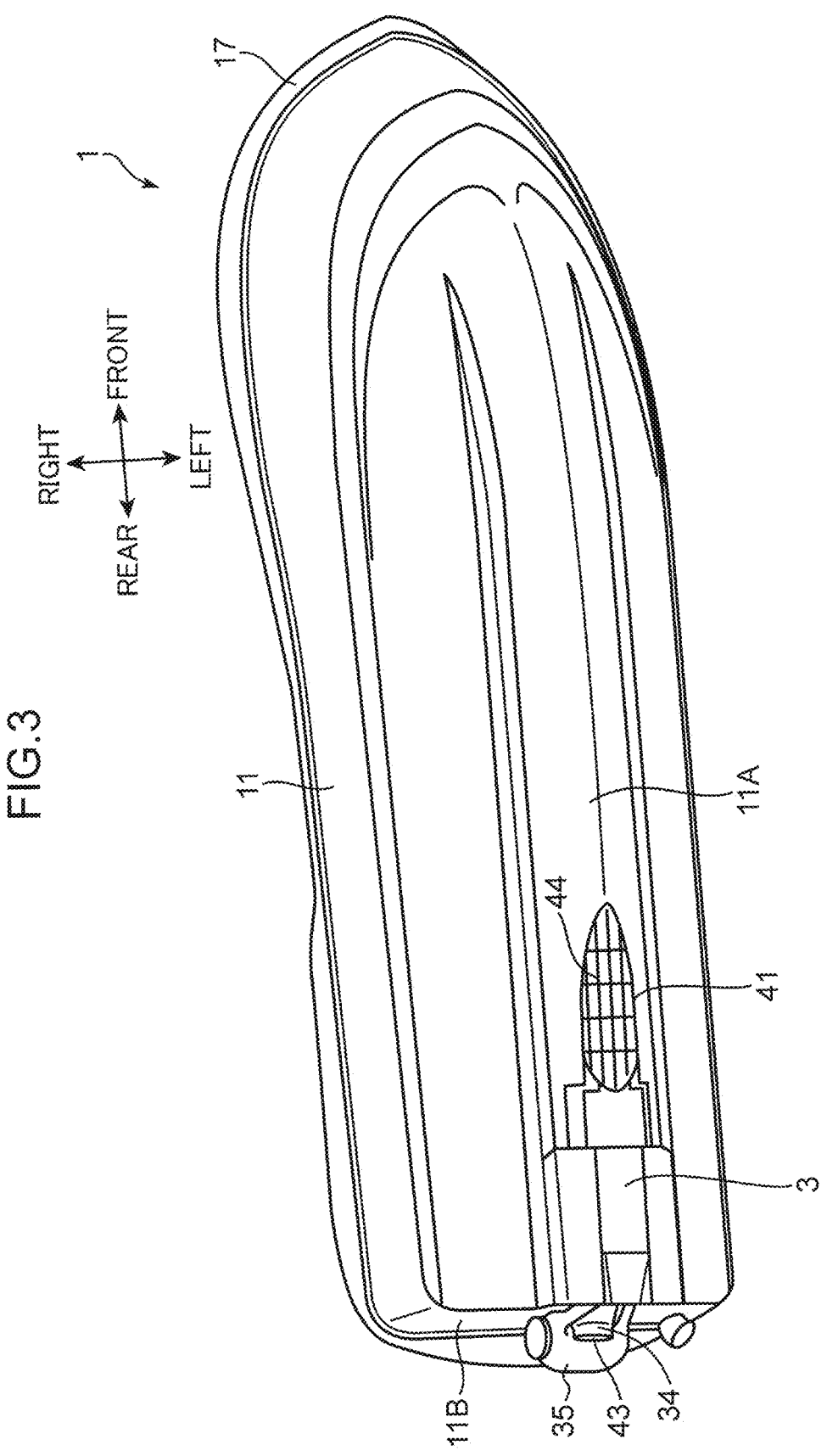
FIG. 3 is a perspective view of the personal watercraft as viewed from a bottom surface side.

FIG. 1 is a partially broken side view of the personal watercraft 1 according to the first embodiment, FIG. 2 is a top view of the personal watercraft 1, and FIG. 3 is a perspective view of the personal watercraft 1 as viewed from the bottom surface side. The personal watercraft 1 according to the present embodiment is a straddle-type jet propulsion boat called a PWC that jets a water flow rearward and navigates in reaction to the water flow. The personal watercraft 1 includes a ship body 10, and an engine 2 and a jet pump 3 that are propulsion drive sources. The ship body 10 is provided with an impeller passage 4 and a bypass passage 5 (recovery water passage) in which a filter unit 6 is disposed. There is a rear end surface 11B of the hull 11.

The ship body 10 includes a hull 11 and a deck 12 that overlies the hull 11. The hull 11 and the deck 12 are connected to each other over the entire circumference by a gunnel line 10G. The deck 12 is provided with a handlebar 13, a driver seat 14, and a display panel 15. The handlebar 13 includes a throttle lever and is operated by the driver to steer the personal watercraft 1. The driver seat 14 is disposed at a substantially central position on the front, rear, left, and right of the deck 12, and is a seat on which the driver and a passenger ride. In the present embodiment, the driver seat 14 for three passengers including the driver is illustrated. The display panel 15 is disposed in front of the handlebar 13 and displays various types of information related to the navigation of the personal watercraft 1, such as a navigation speed, a remaining amount of fuel, and an operation mode.

The deck 12 further includes a front hatch 16, a front bumper 17, a boarding platform 18, and a filter door 19 (opening/closing door). The front hatch 16 covers an upper surface opening of a stowage space provided in front of the display panel 15. The front bumper 17 covers the foremost part of the ship body 10. The boarding platform 18 is disposed behind the driver seat 14 to cover the hull 11 and is used mainly when the driver or a passenger climbs to the driver seat 14 from the water. The filter door 19 is a door that opens and closes an upper opening 6H of an access passage 6A to the filter unit 6 described later. The upper opening 6H is disposed behind the driver seat 14. The filter door 19 is pivotable relative to the ship body 10 and constitutes a part of the boarding platform 18 in a closed state.

The engine 2 is accommodated in an engine room 20 provided inside the hull 11. The engine 2 is, for example, a water-cooled four-stroke multicylinder engine using gasoline as fuel, and generates a driving force for driving the jet pump 3. The engine 2 includes a crankshaft 21 extending in the front-rear direction.

In order to apply a propulsive force to the personal watercraft 1, the jet pump 3 pressurizes and accelerates the water taken in the impeller passage 4 and injects the water rearward. The jet pump 3 includes a pump shaft 31, an impeller 32, a pump case 33, a jet nozzle 34, and a reverse gate 35. The impeller 32 is attached to the rear end of the pump shaft 31, and the front end of the pump shaft 31 is coupled to the rear end of the crankshaft 21.

The impeller 32 generates a jet water flow by rotating about an axis. The driving force of the engine 2 is transmitted to the impeller 32 via the crankshaft 21 and the pump shaft 31. The pump case 33 is disposed behind the impeller 32 and rotatably supports the rear end side of the pump shaft 31.

The jet nozzle 34 is disposed behind the pump case 33 and has an outlet port 43 for jetting a jet water flow generated by the impeller 32. The jet nozzle 34 has a tapered shape in which the passing water cross-sectional area decreases toward the rear. The jet nozzle 34 is pivotable about an axis extending in the up-down direction, and the jet direction of the jet water flow from the outlet port 43, that is, the propulsion direction of the personal watercraft 1 is changed to the left and right by the steering of the handlebar 13. The reverse gate 35 is attached to the jet nozzle 34 pivotably about an axis extending in the left-right direction. When the reverse gate 35 descends so as to cover the outlet port 43, the propulsion direction of the personal watercraft 1 is changed rearward.

The impeller passage 4 is provided in a rear region of the hull 11, and the impeller 32 is disposed. The impeller passage 4 includes, as a water intake opening, a water intake 41 disposed on a bottom surface 11A of the hull 11. As illustrated in FIG. 3, the water intake 41 is attached with an intake strainer 44 that prevents relatively large-sized wastes and foreign matters from entering the impeller passage 4. The discharge opening of the impeller passage 4 is the outlet port 43 described above. The impeller passage 4 is a water passage for pressurizing, by the impeller 32, water taken in from the water intake 41 and injecting the water from the outlet port 43. The vicinity of the rear end of the impeller passage 4 is a tapered part 42 whose passing water cross-sectional area is gradually narrowed, and enters the front end of the jet nozzle 34. In other words, the hull 11 includes a part having at least a tubular shape in which the impeller passage 4 is formed on the inner peripheral surface.

The bypass passage 5 is disposed in the rear region of the hull 11 so as to be parallel with the impeller passage 4. The bypass passage 5 branches from a branching position P1 set on the upstream side of the impeller passage 4, and joins the impeller passage 4 at a joining position P2 on the downstream side of the branching position P1. The branching position P1 is positioned on the downstream side of the impeller passage 4 relative to the water intake 41, and is positioned on the upstream side of the impeller passage 4 relative to the impeller 32. The joining position P2 is positioned on the downstream side of the impeller passage 4 relative to the impeller 32, and is positioned on the upstream side of the impeller passage 4 relative to the jet nozzle 34. The bypass passage 5 is a foreign matter recovery water passage designed to divert a portion of the water taken into the impeller passage 4 for the navigation of the personal watercraft 1 and to trap minute foreign matter contained within that water. The bypass passage 5 incorporates the filter unit 6 that traps objects of a predetermined size while allowing water to pass through. The bypass passage 5 formed in the hull 11 is a passage formed independently of the propulsion mechanism of the personal watercraft 1. Therefore, the degree of freedom is large in the passage design of the bypass passage 5. For example, since the rear region of the hull 11 has larger up-down direction and left-right direction dimensions than those of the impeller passage 4, there is an advantage that the passage area of the bypass passage 5 can be easily formed larger than that of a passage of cooling water taken in to cool a drive source such as an engine.

Details of Recovery Water Passage of First Embodiment

Figure 4:
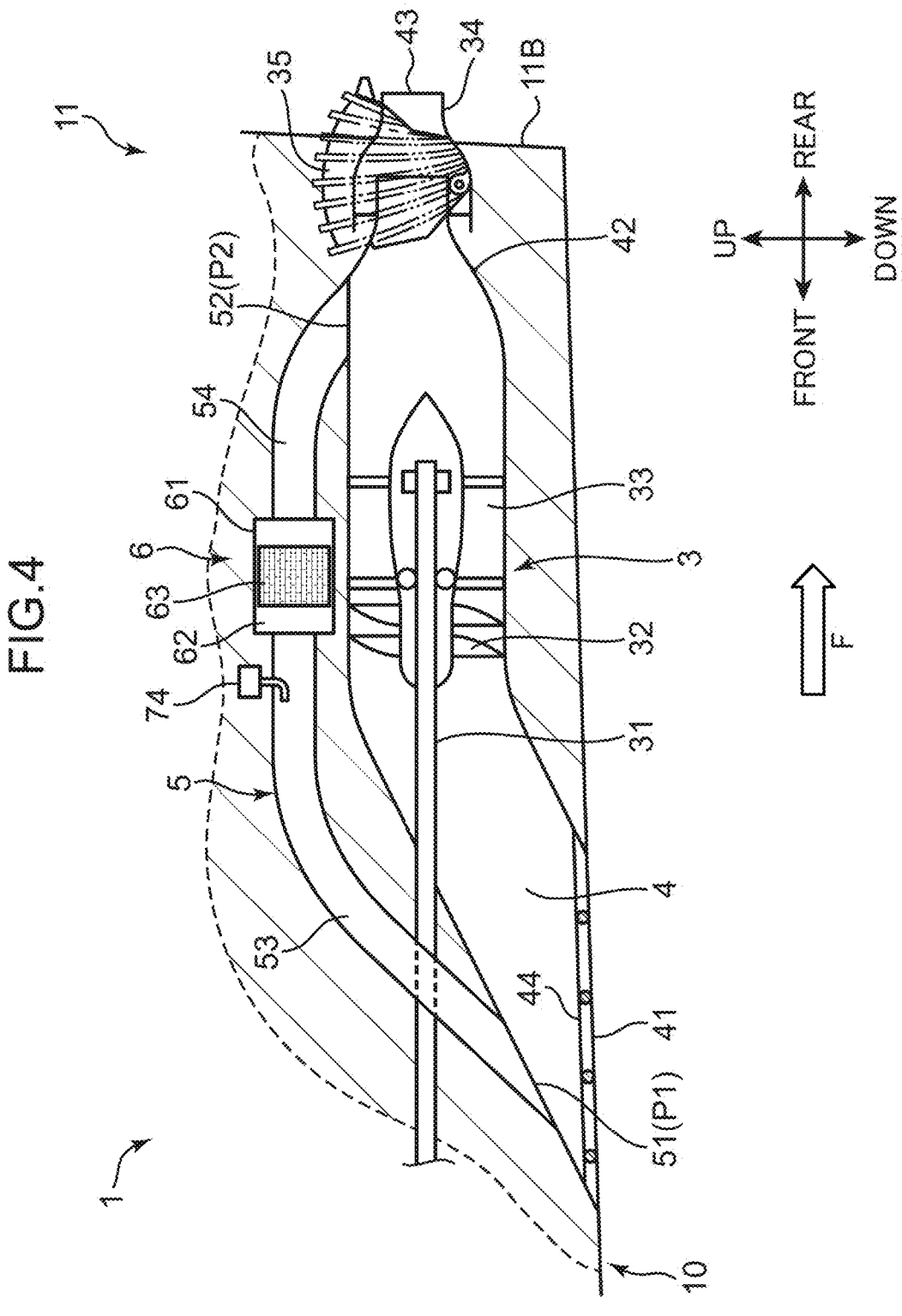
FIG. 4 is an enlarged cross-sectional view of a main part illustrating a broken part of FIG. 1 in an enlarged manner.

Subsequently, the recovery water passage according to the first embodiment will be described in detail with reference to FIG. 4. The recovery water passage, that is, the bypass passage 5 of the first embodiment is an aspect in which part of fresh water or sea water taken in the impeller passage 4 is guided. Flow through the bypass passage 5 is in a flow direction F. It is necessary to provide the recovery water passage with a water intake opening through which water can be taken in when the ship body 10 plains on the water surface (propulsion inclined state) and a discharge opening through which the taken water is discharged. In the first embodiment, the water intake 41 of the impeller passage 4 serves as the water intake opening, and the outlet port 43 serves as the discharge opening. Thus, by adopting the configuration of guiding the water flowing through the impeller passage 4 to the bypass passage 5 as the recovery water passage, there is an advantage of eliminating a need of separately forming the water intake opening and the discharge opening dedicated to the recovery water passage in the hull 11.

The bypass passage 5 includes a bypass inlet 51, a bypass outlet 52, an upstream pipe 53, and a downstream pipe 54. The bypass inlet 51 opens, in the impeller passage 4, on the upstream side relative to the arrangement position of the impeller 32 and in the vicinity of the water intake 41. The arrangement position of the bypass inlet 51 is a branching position of the bypass passage 5 from the impeller passage 4. Part of the water taken in from the water intake 41 during planing enters the bypass passage 5 from the bypass inlet 51.

In the impeller passage 4, the bypass outlet 52 opens to the tapered part 42 whose cross-sectional area is gradually narrowed, the tapered part 42 being on the downstream side relative to the arrangement position of the impeller 32. The arrangement position of the bypass outlet 52 is a joining position of the bypass passage 5 into the impeller passage 4. The upstream pipe 53 is a pipe that connects the bypass inlet 51 and the upstream side of the filter unit 6. The downstream pipe 54 is a pipe connecting the downstream side of the filter unit 6 and the bypass outlet 52. In the present embodiment, the bypass passage 5 is disposed above the impeller passage 4. In the present embodiment, the filter unit 6 is connected to the highest position of the upstream pipe 53. The passage area of the impeller passage 4 adjacent to the branching position P1 is larger than the cross-sectional area of the impeller passage 4 adjacent to the joining position P2. For example, the branching position P1 may be a position adjacent to the water intake 41.

The water taken into the bypass inlet 51 enters the filter unit 6 from the upstream pipe 53. The water from which minute foreign matters have been removed by the filter unit 6 returns from the bypass outlet 52 to the impeller passage 4 via the downstream pipe 54, and is emitted from the outlet port 43 of the jet nozzle 34 together with the jet water flow formed in the impeller passage 4. Since the passage cross-sectional area of the impeller passage 4 is narrowed by the tapered part 42 on the downstream side, the flow speed on the downstream side is higher than that on the upstream side. Therefore, in the impeller passage 4, pressure is lower on the downstream side than on the upstream side. Based on this pressure difference, a flow of water from the branching position P1 toward the joining position P2 is formed. Therefore, it is possible to form a water flow from the bypass inlet 51 toward the bypass outlet 52 without installing a dedicated pump or the like that generates a water flow in the bypass passage 5. The flow speed of the water passing through the bypass passage 5 can be adjusted by adjusting the ratio of the passage cross-sectional area of the branching position P1 to the joining position P2. For example, the passage cross-sectional area at the joining position P2 may be set to 50% or more and less than 100%, and preferably 80% or more and less than 100% of the passage cross-sectional area at the branching position P1. This makes it possible to prevent the flow speed of the bypass passage 5 from becoming excessive.

The filter unit 6 includes a filter case 61 including a filter accommodation space 62 inside thereof, and a filter 63 accommodated in the filter accommodation space 62. The filter case 61 is a casing that includes an internal space that becomes the filter accommodation space 62, for example, a cylindrical space, and has a connection part to the upstream pipe 53 and the downstream pipe 54 and a mounting part of the filter 63. The connection part can be, for example, a flange connection part. The mounting part may adopt various shapes in which the filter 63 is locked in an attachable/detachable state, in other words, in a replaceable state. The filter unit 6 may be a cartridge type attachable/detachable in the flange connection part. The filter accommodation space 62 is preferably formed to have a larger cross-sectional area than that of the upstream pipe 53. This makes it possible to reduce the flow speed of water passing through the filter 63 as compared with the upstream pipe 53, and possible to suppress damage to the filter 63.

The filter 63 traps minute foreign matters contained in water flowing through the bypass passage 5. The size of the minute foreign matters to be trapped can be set to, for example, 10 mm or less and 0.05 mm or more. As illustrated in FIG. 3, the intake strainer 44 is assembled to the water intake 41. The mesh roughness of the filter unit 6 is formed smaller than the roughness of the meshes of the intake strainer 44. Relatively large wastes such as plastic bottles, their lids, plastic bags, and leaves and branch pieces of trees are prevented from entering the impeller passage 4 by being blocked by the intake strainer 44. The foreign matters having a size that has passed through the mesh of the intake strainer 44 enter the impeller passage 4, but generally do not hinder the operation of the impeller 32. The filter 63 traps such minute foreign matters as not to affect planing of the personal watercraft 1 even after passing through the impeller passage 4. The size of the minute foreign matters assumed to be collected in the present embodiment is, for example, 5 mm or less. As the mesh roughness of the filter 63, a size capable of trapping minute foreign matters of the above-described size is selected.

In particular, the filter 63 desirably has a mesh roughness capable of trapping microplastics contained in water. The microplastics are plastic products produced in small-sized main bodies, plastics miniaturized by pulverization by wave force or decomposition by ultraviolet rays, and the like, and have a size of 5 mm or less. For example, it is desirable to select the mesh roughness of the filter 63 for microplastics having a size of 0.1 mm or more and 5 mm or less as a trapping target.

As the filter 63, it is possible to use a strainer having a mesh size capable of trapping the above-described minute foreign matters, layered glass wool, filter cloths using non-woven fabrics, and the like. In order to increase the trap amount of the minute foreign matters, the filter 63 desirably has a surface area larger than the cross-sectional area of the filter accommodation space 62 with respect to the passage direction of water. For example, the filter 63 or strainer may have a dome shape protruding downstream, or glass wool or filter cloth may be arranged in a plurality of layers in the filter accommodation space 62, or may be arranged in a meandering manner.

As illustrated in FIG. 1, an access passage 6A is disposed above the filter unit 6. When clogging of the filter 63 occurs, the maintenance person opens the filter door 19 behind the driver seat 14 and inserts the hand through the upper opening 6H to access the filter unit 6. Then, the maintenance person performs maintenance work such as cleaning or replacing the filter 63 or replacing the filter unit 6 itself.

According to the first embodiment described above, the filter accommodation space 62 is disposed in the bypass passage 5 through which water flows through the impeller passage 4 at the time when the personal watercraft 1 plans the water surface, and therefore, minute foreign matters in the water can be trapped by the filter 63 only by the personal watercraft 1 performing normal navigation. Since the filter accommodation space 62 is provided in the hull 11, it is easy to form the filter accommodation space 62 larger as compared with the case where the same space is provided in an outboard motor or engine unit. This makes it easy to increase the size of the filter 63. For example, by increasing the size of the filter 63, the replacement frequency of the filter 63 can be reduced, or the collection amount that can be collected by one replacement can be increased. The flow speed of the water passing through the bypass passage 5 can be made smaller than that of the impeller passage 4. This makes it possible to suppress collision impact of foreign matters on the filter 63 and to easily prevent breakage of the filter 63. Since the bypass passage 5 is disposed above the impeller passage 4, foreign matters lighter in weight than water can be easily collected. Even if the weight of the foreign matters is relatively heavy, energy is consumed when the foreign matters flows upward from the branching position P1, and the flow speed of the foreign matters is further suppressed. This makes it possible to suppress the speed at which the foreign matters come into contact with the filter 63. Furthermore, since the filter accommodation space 62 is disposed in the bypass passage 5, even if the filter 63 accommodated in the filter accommodation space 62 is clogged, an increase in the water flow resistance of the impeller passage 4 due to the clogging can be suppressed.

Hereinafter, various modified embodiments of the first embodiment will be described as second to seventh embodiments.

Second Embodiment

Figure 5:
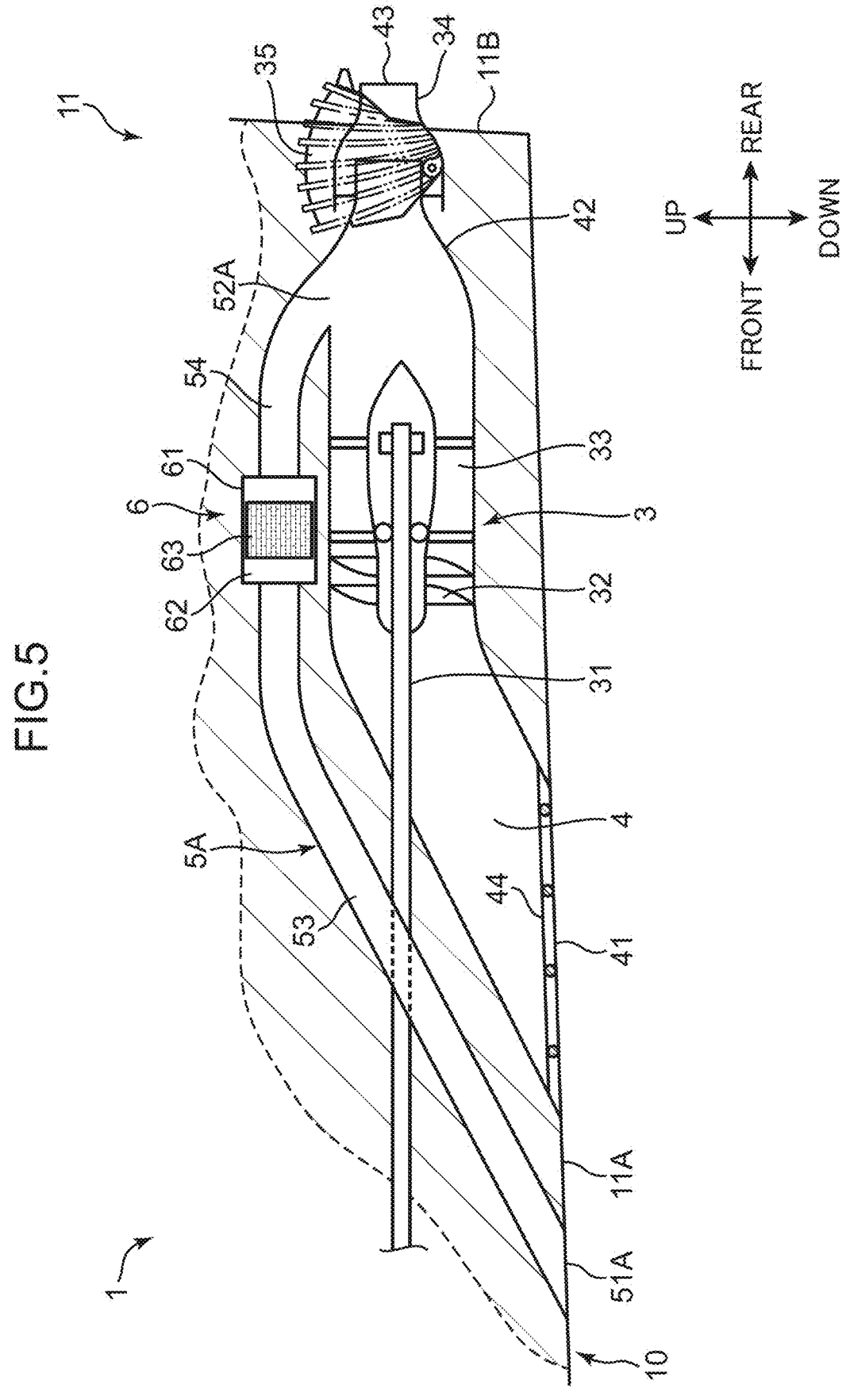
FIG. 5 is a cross-sectional view illustrating a recovery water passage according to a second embodiment.

In the first embodiment, an example has been described in which the water intake 41 of the impeller passage 4 also serves as the water intake opening of the bypass passage 5, which is the recovery water passage. The water intake opening may be provided separately from the water intake 41. FIG. 5 is a cross-sectional view illustrating a recovery water passage 5A of the second embodiment. The recovery water passage 5A includes a recovery inlet 51A, a recovery outlet 52A, the upstream pipe 53, and the downstream pipe 54. The present embodiment is the same as the first embodiment in that the filter unit 6 is incorporated between the upstream pipe 53 and the downstream pipe 54.

The recovery inlet 51A is a water intake opening for taking water into the recovery water passage 5A at the time of planing of the personal watercraft 1, and is disposed on the bottom surface 11A of the hull 11 in front of the water intake 41. The recovery inlet 51A can be provided at an appropriate place of the hull 11, but is desirably disposed near the rear of the bottom surface 11A. This arrangement makes it possible to easily take in water from the recovery inlet 51A by using the movement of the personal watercraft 1 at the time of planing. At the time of planing, the ship body 10 of the personal watercraft 1 is in a propulsion inclined state inclined forward and upward with respect to a still-water surface. Even in such a planing attitude, the recovery inlet 51A is open at a position below the water surface on the bottom surface 11A. The water intake 41 is normally positioned below the water surface in a planing attitude. Therefore, by disposing the recovery inlet 51A in the vicinity of the water intake 41, exposure of the recovery inlet 51A from the water surface can be prevented. Note that in the recovery inlet 51A, a member that blocks entry of large-sized wastes into the recovery water passage 5A, similar to the intake strainer 44, is disposed.

As in the first embodiment, the recovery outlet 52A is open in the tapered part 42 so as to join the impeller passage 4 on the downstream side relative to the arrangement position of the impeller 32. That is, the outlet port 43 of the impeller passage 4 also serves as the discharge opening of the recovery water passage 5A. The upstream pipe 53 connects the recovery inlet 51A and the upstream side of the filter unit 6. The downstream pipe 54 connects the downstream side of the filter unit 6 and the recovery outlet 52A.

The water taken in from the recovery inlet 51A enters the filter unit 6 from the upstream pipe 53, and minute foreign matters are removed. The water from which minute foreign matters have been removed joins the impeller passage 4 from the recovery outlet 52A via the downstream pipe 54, and is emitted from the outlet port 43 of the jet nozzle 34 together with the jet water flow formed in the impeller passage 4. As a modification of the second embodiment, the recovery inlet 51A may be disposed away from the water intake 41 in the left-right direction or may be disposed behind the water intake 41. A plurality of the recovery inlets 51A may be formed. The position of the recovery outlet 52A is preferably set such that the pressure of the recovery outlet 52A at the joining position into the impeller passage 4 is smaller than the water pressure received by the recovery inlet 51A during planing.

Third Embodiment

Figure 6:
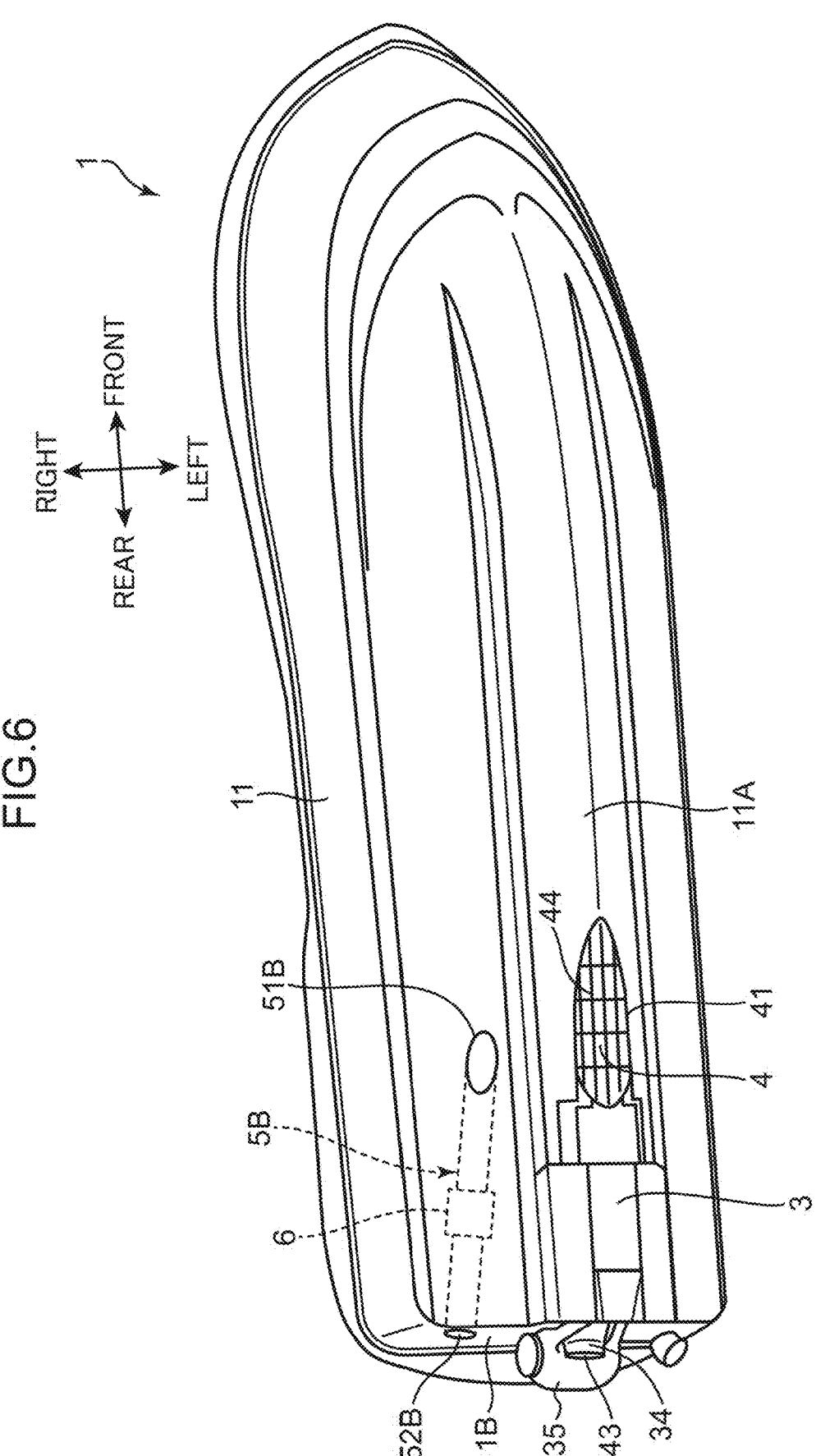
FIG. 6 is a perspective view illustrating a recovery water passage according to a third embodiment.

In the second embodiment, an example in which the downstream side of the recovery water passage 5A is also used as the impeller passage 4 has been described. In the third embodiment, an example in which the recovery water passage is a water passage completely independent of the impeller passage 4 will be described. FIG. 6 is a perspective view of the personal watercraft 1 illustrating a recovery water passage 5B according to the third embodiment.

The recovery water passage 5B includes a recovery inlet 51B and a recovery outlet 52B. The recovery inlet 51B is disposed on the bottom surface 11A of the hull 11 on the right of the water intake 41. The recovery outlet 52B is disposed on a rear end surface 11B of the hull 11. That is, both the recovery inlet 51B and the recovery outlet 52B are disposed at positions different from the water intake 41 and the outlet port 43 of the impeller passage 4. The filter unit 6 is disposed at an appropriate place of the recovery water passage 5B.

The water taken in from the recovery inlet 51B enters the filter unit 6 of the recovery water passage 5B, and minute foreign matters are removed. The water from which minute foreign matters have been removed is emitted from the recovery outlet 52B to the outside of the hull 11. The recovery inlet 51B can be provided at an appropriate place of the hull 11, but is desirably disposed near the rear of the bottom surface 11A. The recovery outlet 52B can also be provided at an appropriate place of the hull 11, but is desirably disposed on the rear end surface 11B in consideration of drainage. A plurality of the recovery inlets 51B independent of the impeller passage 4 may be provided. For example, FIG. 6 illustrates an example in which the recovery water passage 5B is arranged only on the right of the impeller passage 4, but the recovery water passage 5B may be arranged on the both left and right sides of the impeller passage 4. The recovery water passage 5B may be disposed in parallel with a water surface assumed at the time of planing of the personal watercraft 1. This makes it possible to reduce the flow path resistance flowing through the recovery water passage 5B during planing, and possible to increase the amount of water passing per unit time. Conversely, in order to suppress the speed of water passing through the filter unit 6, at least a part of the recovery water passage 5B may be arranged so as to be non-parallel to the water surface assumed at the time of planing.

Fourth Embodiment

Figure 7:
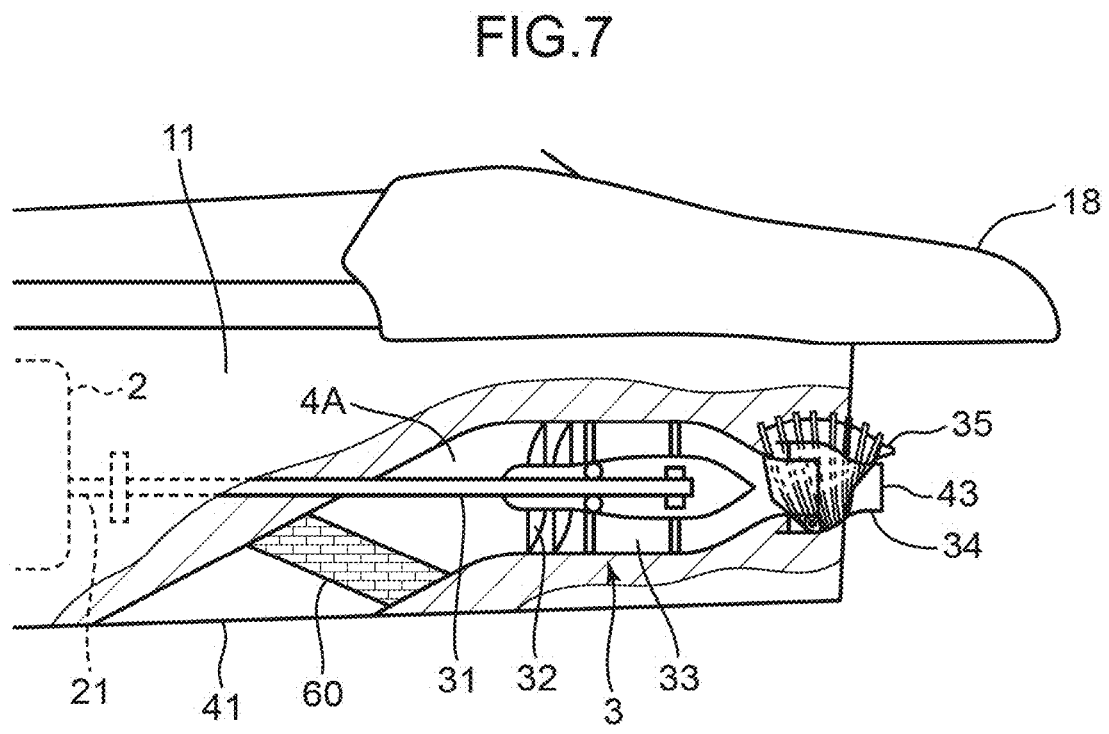
FIG. 7 is a cross-sectional view illustrating a recovery water passage according to a fourth embodiment.

In the first to third embodiments, an example has been described in which a part or entirety of the recovery water passage is a passage independent of the impeller passage 4, and the filter unit 6 is disposed in the independent passage part. Alternatively, the entire impeller passage may be used as the recovery water passage. FIG. 7 is a cross-sectional view illustrating an impeller passage 4A of the fourth embodiment also serving as a recovery water passage.

The impeller passage 4A is a passage that includes the water intake 41 and the outlet port 43, and in which the jet pump 3 is disposed. When the impeller 32 is rotationally driven by the engine 2, a jet water flow is injected from the outlet port 43. The filter unit 60 is disposed in the impeller passage 4A. The filter unit 60 incorporates a filter that traps minute foreign matters.

The filter unit 60 is assembled to the impeller passage 4A at a position on the upstream side relative to the impeller 32 and not interfering with a penetration part of the pump shaft 31. Although the filter unit 60 can be assembled to the impeller passage 4A on the downstream side relative to the impeller 32, it is desirable to set it on the upstream side because the jet water flow is sometimes affected. The filter unit 60 may be attached to the intake strainer 44 (FIG. 3)

attached to the water intake 41. According to the fourth embodiment, since the impeller passage 4A also serves as the recovery water passage of the minute foreign matters, it is not necessary to separately form the recovery water passage itself in the hull 11.

Fifth Embodiment

Figure 8:
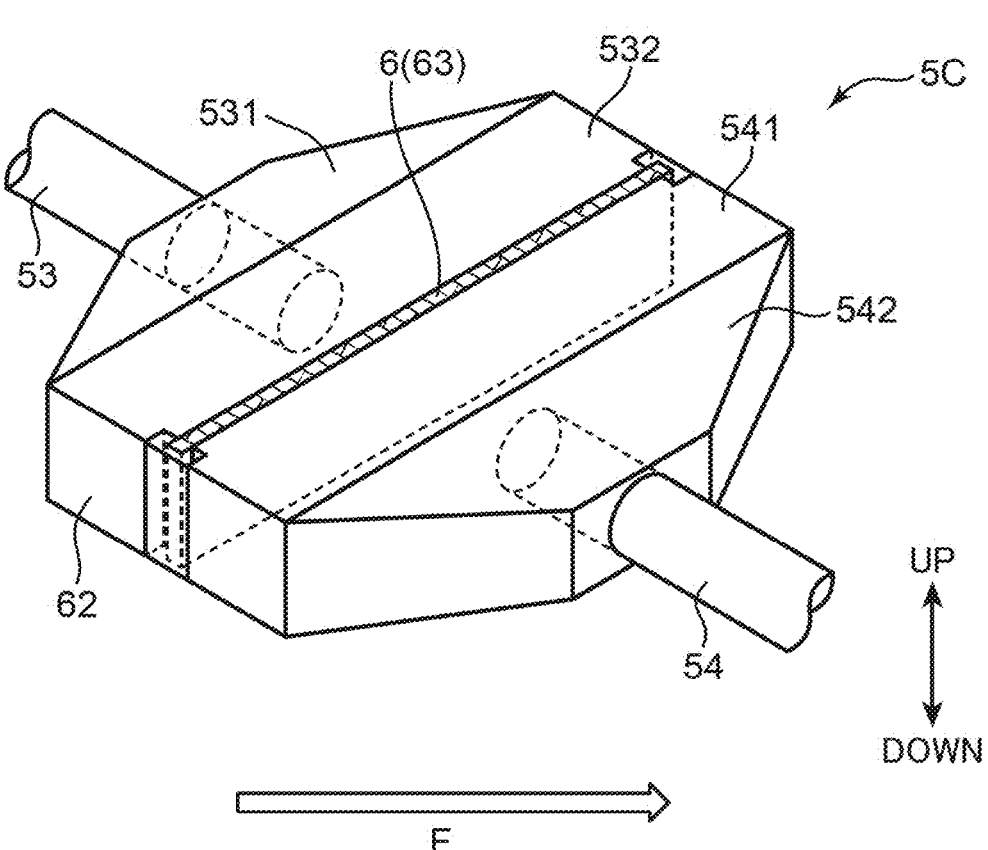
FIG. 8 is a cross-sectional view illustrating a recovery water passage according to a fifth embodiment.

FIG. 8 is a cross-sectional view illustrating a part of a recovery water passage 5C according to the fifth embodiment. FIG. 8 additionally illustrates a flow direction F of water flowing through the recovery water passage 5C. The recovery water passage 5C includes the upstream pipe 53 (first part) and the downstream pipe 54 (first part) disposed with the filter unit 6 interposed therebetween. The upstream pipe 53 and the downstream pipe 54 are configured of a pipe body having a predetermined cross-sectional area.

An enlarged diameter tapered part 531 and a large diameter part 532 (second part) are connected consecutively to a downstream end in the flow direction F of the upstream pipe 53. The large diameter part 532 has a cross-sectional area larger than that of the upstream pipe 53. The enlarged diameter tapered part 531 is a portion that fills the diameter difference between the upstream pipe 53 and the large diameter part 532. A large diameter part 541 (second part) and a reduced diameter tapered part 542 are connected consecutively to an upstream end in the flow direction F of the downstream pipe 54. The large diameter part 541 has a cross-sectional area larger than that of the downstream pipe 54. The reduced diameter tapered part 542 is a portion that fills the diameter difference between the large diameter part 541 and the downstream pipe 54. That is, the recovery water passage 5C has the upstream pipe 53 and the downstream pipe 54 that have predetermined pipe diameters, and the large diameter parts 532 and 541 that have pipe diameters larger than those of the upstream pipe 53 and the downstream pipe 54.

The filter unit 6 having the filter accommodation space 62 is disposed in the large diameter parts 532 and 541 having large cross-sectional areas. Since the large diameter parts 532 and 541 have larger cross-sectional areas than those of the upstream pipe 53 and the downstream pipe 54, the flow speed of water becomes smaller than that when passing through the upstream pipe 53 and the downstream pipe 54. Therefore, by accommodating the filter 63 in the large diameter parts 532 and 541, it is possible to suppress damage to the filter 63 due to passage of water. By forming the large diameter parts 532 and 541 to suppress the passage flow speed of water, there is also an advantage that minute foreign matters can be easily trapped by the filter 63. By forming the enlarged diameter tapered part 531, the flow of water in the enlarged diameter direction can be facilitated, and concentration of foreign matters on a part opposing the outlet of the upstream pipe 53 can be easily prevented.

FIG. 8 illustrates an example in which the upstream pipe 53 and the downstream pipe 54 that have small cross-sectional areas are disposed on both the upstream side and the downstream side of the large diameter parts 532 and 541 that have large cross-sectional areas. Alternatively, a pipe having a small cross-sectional area may be disposed only on one of the upstream side and the downstream side of the large diameter parts 532 and 541. Alternatively, installation of any one of the large diameter parts 532 and 541 may be omitted. The unit of the recovery water passage 5C as illustrated in FIG. 8 may be applied to the first to third embodiments. A recovery water passage thus formed in a non-cylindrical shape is also included in the present disclosure.

Sixth Embodiment

Figure 9:
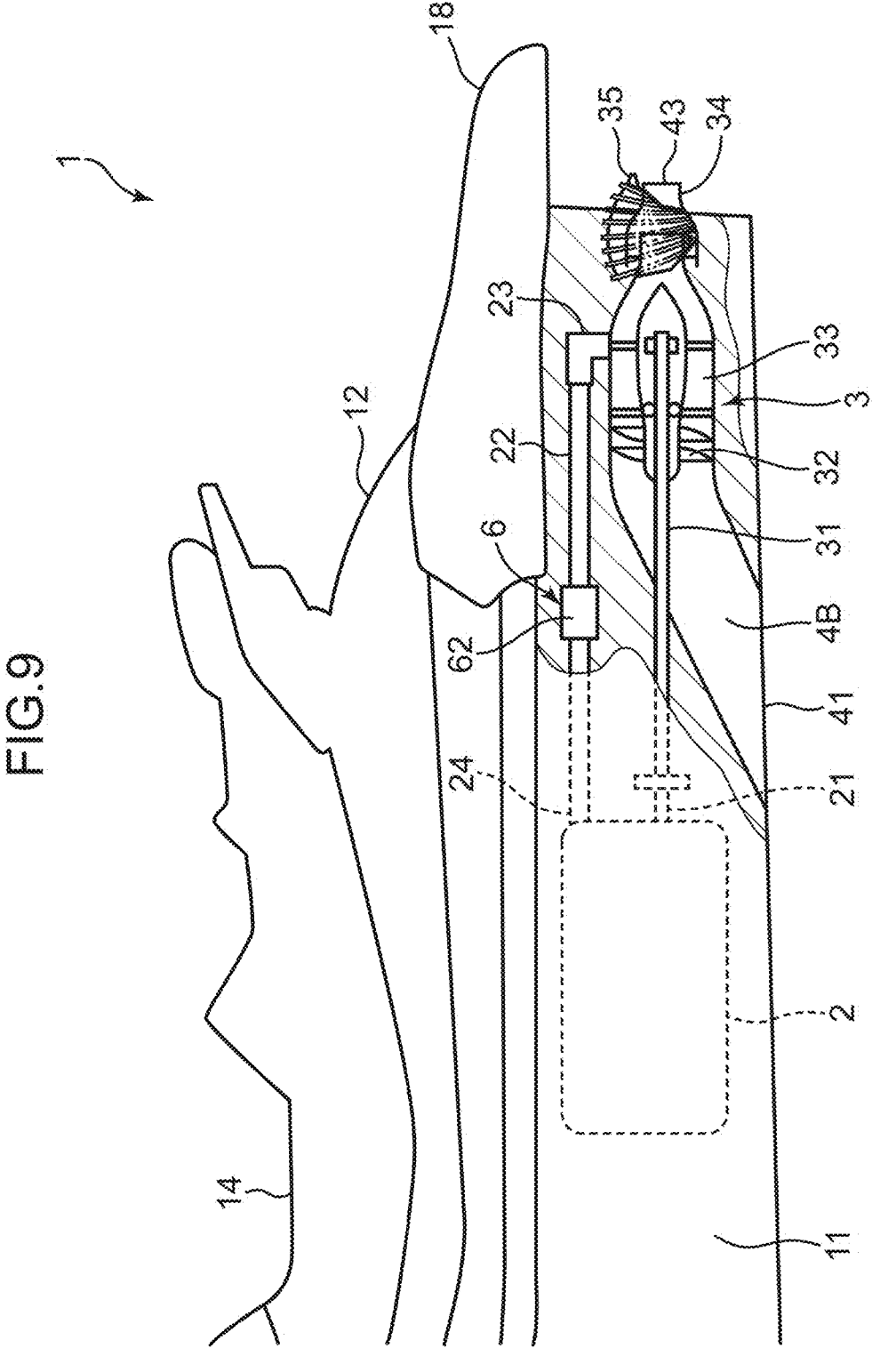
FIG. 9 is a cross-sectional view illustrating a recovery water passage according to a sixth embodiment.

In the sixth embodiment, an example in which a water-cooling system of the engine 2 is used as a recovery water passage will be described. FIG. 9 is a cross-sectional view illustrating the personal watercraft 1 according to the sixth embodiment. The personal watercraft 1 has an impeller passage 4B having the water intake 41 and the outlet port 43 and in which the jet pump 3 is disposed, and a cooling passage 22 (recovery water passage) that cools the engine 2 accommodated inside the hull 11.

The cooling passage 22 includes an upstream end 23 serving as a cooling water intake and a downstream end 24 connected to the engine 2. The filter unit 6 is incorporated in the middle of the cooling passage 22. The upstream end 23 is open to the impeller passage 4B on the downstream side relative to the impeller 32. The downstream end 24 is connected to a water jacket included in the engine 2. Part of the water pressurized by the impeller 32 is introduced into the cooling passage 22, and minute foreign matters contained in the water introduced by the filter unit 6 are trapped.

According to the sixth embodiment, the recovery water passage for collecting the minute foreign matters partially includes the cooling passage 22 for cooling the engine 2. That is, it becomes possible to install the filter unit 6 using the cooling passage 22 formed in the hull 11, which is essential in a case where the engine 2 of the internal combustion engine is installed, and possible to collect the minute foreign matters. Since the filter unit 6 is provided in the hull 11, there is also an advantage that the filter accommodation space 62 can be easily formed large.

Seventh Embodiment

Figure 10:
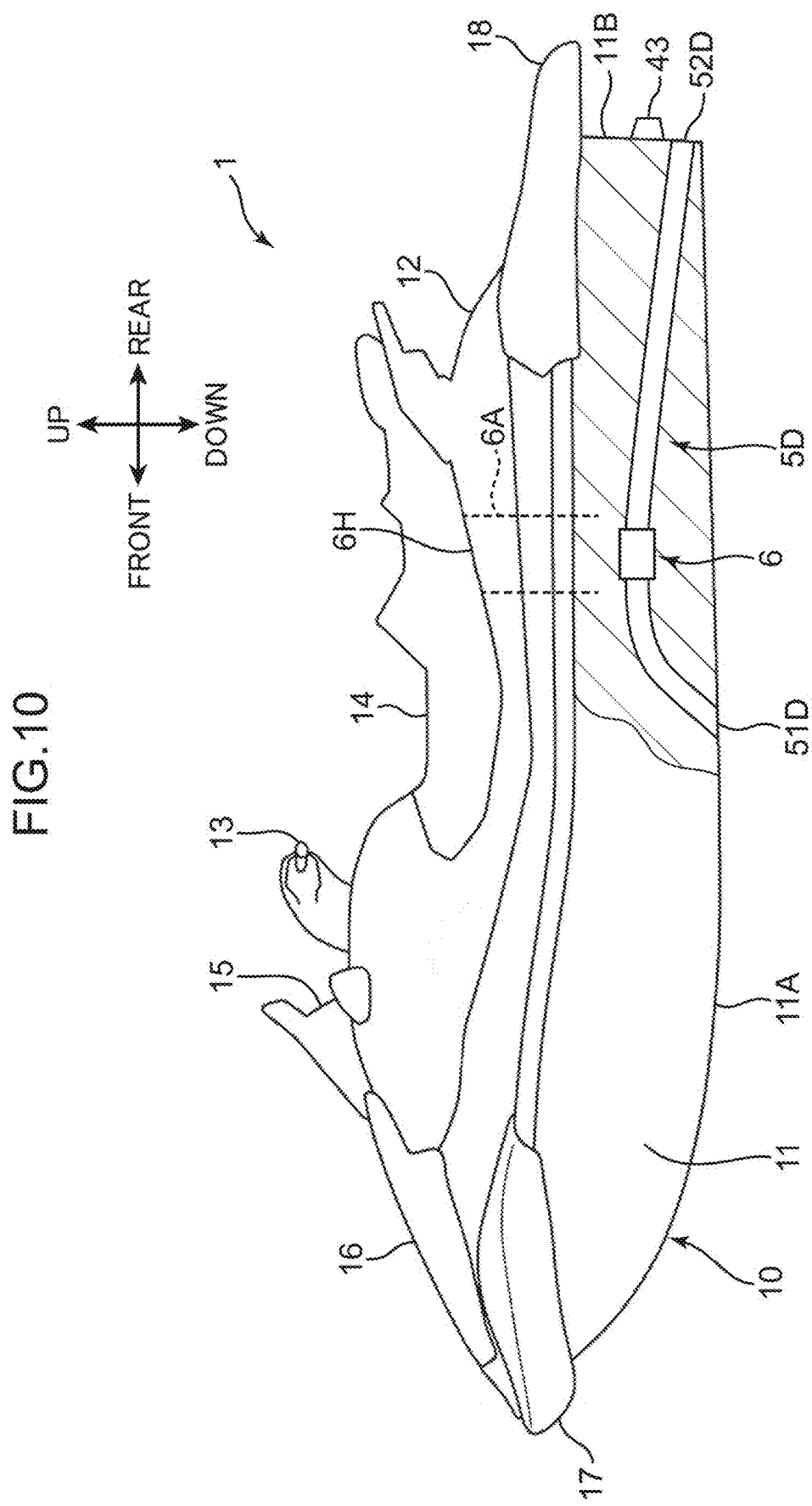
FIG. 10 is a cross-sectional view illustrating a recovery water passage according to a seventh embodiment.

FIG. 10 is a partially broken side view illustrating the personal watercraft 1 according to the seventh embodiment. In the first embodiment, as illustrated in FIGS. 1 and 2, an example in which the access passage 6A of the filter unit 6 is disposed behind the driver seat 14, and the upper opening 6H is sealed by the filter door 19 has been described. In the seventh embodiment, an example in which the access passage 6A is provided at the bottom of the driver seat 14 will be described.

The personal watercraft 1 according to the seventh embodiment includes a recovery water passage 5D provided independently of the impeller passage 4, the recovery water passage 5D including a recovery inlet 51D disposed on the bottom surface 11A of the hull 11 and a recovery outlet 52D disposed on the rear end surface 11B. The recovery inlet 51D is disposed at a front position of the bottom surface 11A. The filter unit 6 is incorporated in the recovery water passage 5D. The filter unit 6 is positioned below the driver seat 14.

The access passage 6A extending in the up-down direction is provided above the filter unit 6. The upper end of the access passage 6A is the upper opening 6H opened upward. The upper opening 6H is an opening positioned at the bottom of the driver seat 14. The upper opening 6H is exposed by removing the driver seat 14 from the ship body 10. The maintenance person can access the filter unit 6 by inserting the hand through the upper opening 6H and perform required maintenance work for the filter unit 6.

Other Embodiments

Figure 11:
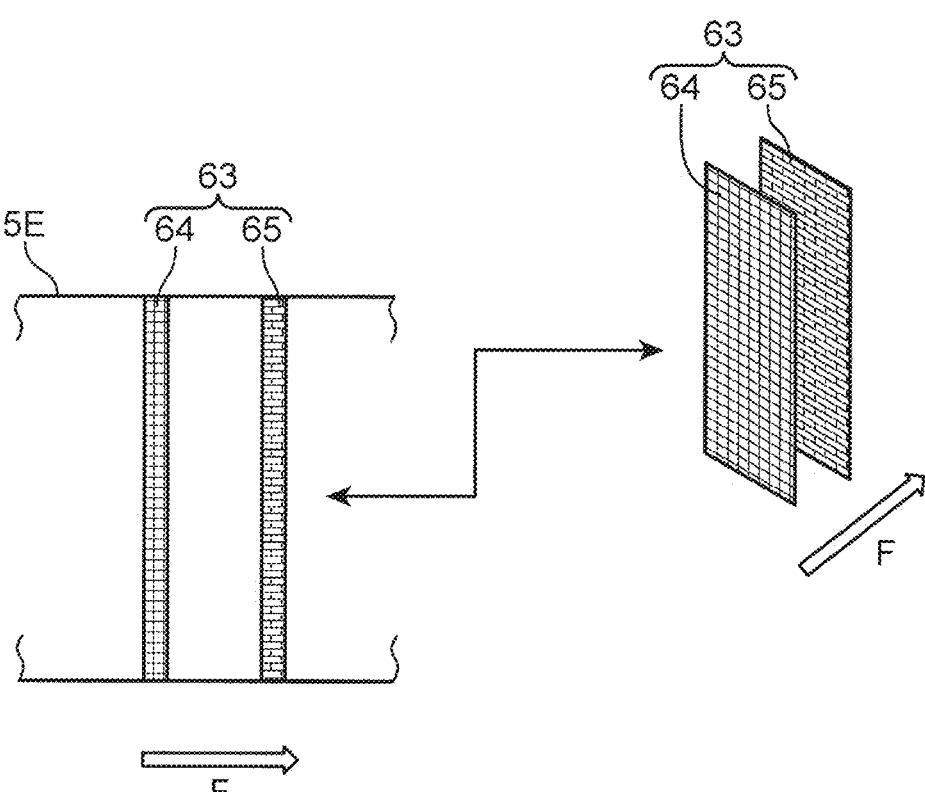
FIG. 11 is a view schematically illustrating a configuration example of a filter.

FIG. 11 is a view schematically illustrating a configuration example of the filter 63. FIG. 11 illustrates an example in which the filter 63 includes a combination of a primary filter 64 and a secondary filter 65. In the flow direction F of the water flowing through a recovery water passage 5E, the primary filter 64 is disposed on the upstream side, and the secondary filter 65 is disposed on the downstream side. The primary filter 64 has a predetermined mesh roughness. The secondary filter 65 has a finer mesh roughness than that of the primary filter 64. The primary filter 64 is configured of a member having higher rigidity than that of the secondary filter 65.

According to the filter 63 of the above aspect, foreign matters can be trapped in two stages of the primary filter 64 and the secondary filter 65. For example, among foreign matters collected in the recovery water passage 5E, foreign matters having relatively large sizes can be trapped by the primary filter 64, and minute foreign matters such as microplastics can be trapped by the secondary filter 65. Since the primary filter 64 having high rigidity is disposed on the upstream side in the flow direction F, it is possible to suppress damage to the secondary filter 65 that is intended to trap minute foreign matters.

In the filter 63 of the two-stage type, the secondary filter 65 may be attachable/detachable to/from the primary filter 64. For example, the secondary filter 65 may be attachable/detachable to/from the primary filter 64 by using a fastener such as a screw or a locking tool such as a hook. This makes it possible to perform an operation of replacing only the secondary filter 65 while leaving the primary filter 64 on the ship body. Note that an aspect may be adopted in which the primary filter 64 does not substantially include a filter function and only has a retaining function of the secondary filter 65.

The personal watercraft 1 may include a sensor that detects the degree of clogging of the filter 63, and a notification unit that notifies of the detection result of the sensor. FIG. 12 is a block diagram illustrating an example of the electrical configuration of the personal watercraft 1. The personal watercraft 1 includes, in addition to the engine 2 and the display panel 15 described above, a start switch 71, a stop switch 72, a throttle 73, a filter sensor 74, a nozzle motor 75, an alarm device 76 as the notification unit, and a control unit 7 that integrally controls these operations.

The start switch 71 is a switch that starts the engine 2. The stop switch 72 is a switch for forcibly stopping the engine 2, and operates when the driver presses the stop switch or pulls out a tether cord. The throttle 73 is mounted on the handlebar 13 and controls output of the engine 2. The filter sensor 74 is a sensor that detects the degree of clogging of the filter 63 of the filter unit 6. The nozzle motor 75 is a power source that changes the posture of the reverse gate 35 in order to switch the propulsion mode of the personal watercraft 1 to forward or rearward. The alarm device 76 is a device that notifies the driver of the detection result by sound, light, an image, or the like when the filter sensor 74 detects clogging of the filter 63.

The filter sensor 74 can be a pair of pressure sensors disposed in the upstream pipe 53 and the downstream pipe 54 of the bypass passage 5 (recovery water passage), for example. A difference $\Delta P = P1 - P2$ between pressure P1 on the upstream side and pressure P2 on the downstream side of the filter unit 6 is obtained, and if $\Delta P$ is equal to or less than a predetermined threshold, no significant clogging has occurred in the filter 63. On the other hand, when $\Delta P$ is equal to or larger than the threshold, it is determined that clogging has occurred in the filter 63, and the alarm device 76 notifies the driver that clogging has occurred. The notification is, for example, a message or an image to be displayed on the display panel 15, lighting of an indicator, or sounding of a buzzer or the like. This makes it possible to prompt the driver to perform necessary maintenance work such as cleaning and replacement of the filter 63.

Other than this, the following modified embodiments may be adopted.

In the above embodiments, the engine 2 having an internal combustion engine has been exemplified as the propulsion drive source of the personal watercraft 1, but a propulsion drive source other than the engine 2 may be used. For example, a drive source using an electric motor or a hybrid drive source of an electric motor and an engine may be used.

In the first embodiment, an example in which the bypass passage 5 is disposed above the impeller passage 4 has been described. Alternatively, an aspect in which the bypass passage 5 is formed on either or both of the left and right sides of the impeller passage 4.

The filter accommodation space 62 of the filter unit 6 is only required to be formed in a structure capable of trapping minute foreign matters, and the structure can be appropriately changed. For example, when the minute foreign matters to be collected are heavier than water, the filter accommodation space 62 may be a structure using a cyclone type trap structure. In the cyclone type trap structure, a swirling flow is formed in a housing, and foreign substances are moved radially outward by a centrifugal force and collected. On the other hand, when the minute foreign matters to be collected are lighter than water, the filter accommodation space 62 may be a structure using the cyclone type trap structure that similarly forms a swirling flow and moves the foreign matters radially inward by a centrifugal force to collect the foreign matters.

Figure 13:
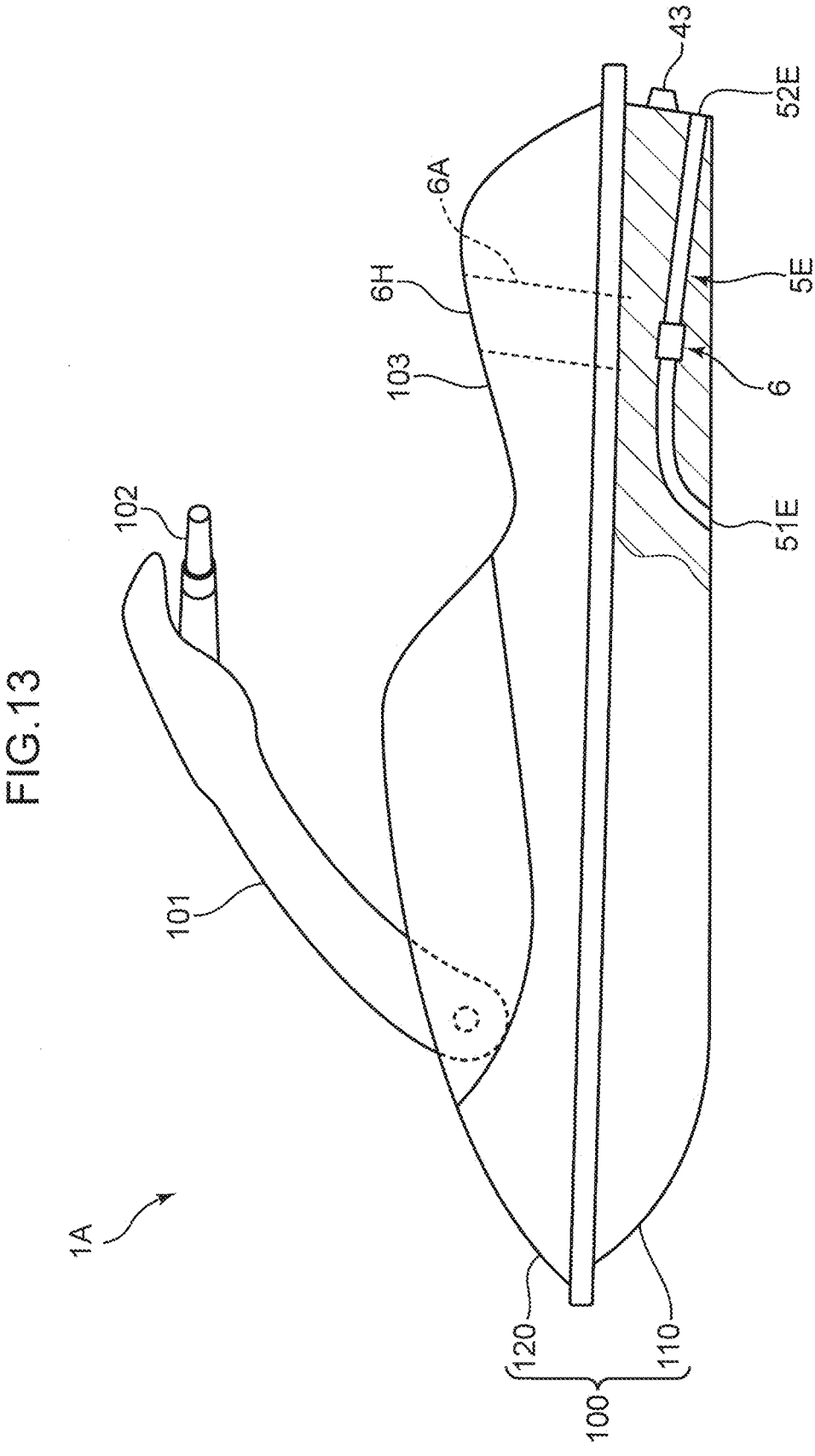
FIG. 13 is a side view illustrating another example of the personal watercraft including the recovery water passage.

In the embodiments described above, the personal watercraft 1 of the straddle-type including the driver seat 14 has been exemplified as the personal watercraft according to the present disclosure. The personal watercraft may be of a stand up type on which the driver rides in a standing position. FIG. 13 is a side view of a stand up type personal watercraft 1A to which the present disclosure is applied. The personal watercraft 1A includes a ship body 100 including a hull 110 and a deck 120, and a movable handlebar pole 101. A handlebar 102 steered by the driver is attached near the upper end of the handlebar pole 101. The deck 120 behind the handlebar 102 is a boarding part 103 on which the driver boards in a standing position.

The recovery water passage 5E is provided inside the hull 110. The recovery water passage 5E has a recovery inlet 51E disposed on the bottom surface of the hull 110 and a recovery outlet 52E disposed on the rear end surface. The filter unit 6 is incorporated in the recovery water passage 5E. The filter unit 6 is positioned below the boarding part 103. The access passage 6A extending in the up-down direction is provided above the filter unit 6. The upper end of the access passage 6A is the upper opening 6H opened upward. The upper opening 6H is covered with an opening/closing lid constituting a part of the boarding part 103. The driver can open the opening/closing lid, insert the hand through the upper opening 6H to access the filter unit 6, and perform necessary maintenance work on the filter unit 6.

SUMMARY OF PRESENT DISCLOSURE

The specific embodiments described above include a disclosure having the following configurations.

A personal watercraft according to a first aspect of the present disclosure includes: a ship body including a deck and a hull; and a recovery water passage provided in the hull and having a water intake opening through which water can be taken in when the ship body planes on a water surface and a discharge opening through which taken water is discharged, in which the recovery water passage is formed with a filter accommodation space that accommodates a filter that traps minute foreign matters contained in water flowing through the recovery water passage.

According to the first aspect, since the filter accommodation space is arranged in the recovery water passage through which water flows at the time of water surface planing, it is possible to trap minute foreign matters in the water only by the personal watercraft performing normal navigation. Since the filter accommodation space is provided in the hull, it is easy to form the filter accommodation space to be large as compared with the case where the filter accommodation space is provided in the engine unit serving as the propulsion power source of the outboard motor. This makes it easy to increase the size of the filter, and makes it possible to suppress deterioration of cleanup performance.

A personal watercraft according to a second aspect is the personal watercraft according to the first aspect, in which the water intake opening is disposed on a bottom surface of the hull.

According to the second aspect, since the water intake opening is disposed on the bottom surface of the hull inclined upward in the traveling direction at the time of planing, water can be taken in from the water intake opening using the movement of the boat at the time of planing.

A personal watercraft according to a third aspect is the personal watercraft according to the first aspect, further including: an impeller that generates a jet water flow; and an impeller passage in which the impeller is disposed, the impeller passage pressurizing water taken in from the water intake opening and injecting the water from the discharge opening, in which at least part of water flowing through the impeller passage is guided to the recovery water passage.

According to the third aspect, since the water flowing through the impeller passage is guided to the recovery water passage, it is not necessary to form a water intake opening dedicated to the recovery water passage in the hull. In an aspect in which the entire water flowing through the impeller passage is guided to the recovery water passage, that is, an aspect in which the impeller passage also serves as the recovery water passage, it is not necessary to separately form the recovery water passage itself.

A personal watercraft according to a fourth aspect is the personal watercraft according to the third aspect, in which the recovery water passage includes a bypass passage branching from a predetermined branching position of the impeller passage and joining the impeller passage at a joining position on a downstream side relative to the branching position, and the filter accommodation space is disposed in the bypass passage.

According to the fourth aspect, since the filter accommodation space is disposed in the bypass passage, even if clogging of the filter accommodated in the filter accommodation space occurs, it is possible to suppress an increase in water flow resistance of the impeller passage due to the clogging.

A personal watercraft according to a fifth aspect is the personal watercraft according to the first aspect, further including; an impeller that generates a jet water flow; and an impeller passage in which the impeller is disposed, the impeller passage pressurizing water taken in from the water intake opening and injecting the water from the discharge opening, in which the recovery water passage joins the impeller passage on a downstream side relative to an arrangement position of the impeller.

According to the fifth aspect, due to the jet water flow generated by the impeller, the pressure at the joining position to the impeller passage can be reduced with respect to the water intake opening side in the recovery water passage. Therefore, it is possible to form a water flow from the water intake opening toward the joining position without installing a dedicated pump or the like that generates a water flow in the recovery water passage.

A personal watercraft according to a sixth aspect is the personal watercraft according to the first aspect, further including: an engine that is accommodated inside the hull and generates a driving force, in which the recovery water passage at least partially includes a cooling passage for cooling the engine.

According to the sixth aspect, it is possible to install the filter accommodation space using the cooling passage, which is essential when the engine is installed, and to collect minute foreign matters. Since the filter accommodation space is provided in the hull, there is also an advantage that the filter accommodation space can be easily formed large.

A personal watercraft according to a seventh aspect is the personal watercraft according to the first aspect, in which the recovery water passage includes a first part having a predetermined cross-sectional area and a second part having a cross-sectional area larger the cross-sectional area of the first part, the first part is disposed on at least one of an upstream side and a downstream side of the second part, and the filter accommodation space is disposed in the second part.

According to the seventh aspect, the flow speed becomes lower in the second part having a larger cross-sectional area than in the first part where water is introduced or emitted. This makes it possible to suppress damage caused by passage of water to the filter accommodated in the filter accommodation space arranged in the second part. By suppressing the passage flow speed of water in the second part, there is also an advantage that the minute foreign matters can be easily trapped by the filter.

A personal watercraft according to an eighth aspect is the personal watercraft according to the first aspect, further including: a filter accommodated in the filter accommodation space, in which the filter has a surface area larger than a cross-sectional area of the filter accommodation space.

According to the eighth aspect, the trap amount of minute foreign matters can be increased.

A personal watercraft according to a ninth aspect is the personal watercraft according to any of the first to eighth aspects, further including: a filter accommodated in the filter accommodation space, in which the filter includes a primary filter and a secondary filter disposed on a downstream side of the primary filter, the secondary filter is finer in mesh than the primary filter, and the primary filter is higher in rigidity than the secondary filter.

According to the ninth aspect, foreign matters can be trapped in two stages of the primary filter and the secondary filter. By making the secondary filter finer in mesh than the primary filter, foreign matters having relatively large sizes can be trapped by the primary filter, and minute foreign matters such as microplastics can be trapped by the secondary filter. Furthermore, since the primary filter having high rigidity is disposed on the upstream side, damage to the secondary filter can be suppressed.

A personal watercraft according to a tenth aspect is the personal watercraft according to the ninth aspect, in which the secondary filter is attachable/detachable to/from the primary filter.

According to the tenth aspect, it is possible to perform an operation of replacing only the secondary filter while leaving the primary filter on the ship body.

A personal watercraft according to an eleventh aspect is the personal watercraft according to any of the first to tenth aspects, further including: a sensor that detects a degree of clogging of the filter; and a notification unit that notifies a detection result of the sensor.

According to the eleventh aspect, since the degree of clogging of the filter can be notified to the driver, replacement or cleaning of the filter can be prompted.

A personal watercraft according to a twelfth aspect is the personal watercraft according to any of the first to eleventh aspects, further including: an opening/closing door provided on the ship body, in which the opening/closing door is disposed at a position where an arrangement place of the filter accommodation space in the recovery water passage can be accessed.

According to the twelfth aspect, replacement work or the like of the filter accommodated in the filter accommodation space can be easily performed by opening/closing of the opening/closing door.

A personal watercraft according to a thirteenth aspect is the personal watercraft according to any of the first to eleventh aspects, further including: an access passage having an opening below a driver boarding part and communicating with the filter accommodation space.

According to the thirteenth aspect, replacement work or the like of the filter accommodated in the filter accommodation space can be performed from the bottom of the lower seat of the driver boarding part through the access passage, such as the bottom of the driver seat or the feet of the driver in a standing type PWC.

A personal watercraft according to a fourteenth aspect is the personal watercraft according to any of the first to eleventh aspects, further including: an access passage having an opening behind a driver seat and communicating with the filter accommodation space.

According to the fourteenth aspect, replacement work or the like of the filter accommodated in the filter accommodation space can be performed from the rear of the driver seat through the access passage.

A personal watercraft according to a fifteenth aspect is the personal watercraft according to any of the first to fourteenth aspects, in which the filter is a filter having mesh roughness capable of trapping microplastics contained in water as the minute foreign matters.

According to the fifteenth aspect, microplastics in the water can be collected only by normally operating the personal watercraft.

What is claimed is:

1. A personal watercraft comprising:
a ship body including a deck and a hull;
an impeller that generates a jet water flow;
an impeller passage in which the impeller is disposed, the impeller passage having a first water intake opening and a first discharge opening; and
a recovery water passage in the hull, the recovery water passage being independent from and unconnected with the impeller passage, the recovery water passage having a second water intake opening through which water can be taken in when the ship body planes on a water surface and a second discharge opening through which taken water is discharged,
wherein:
the recovery water passage includes a filter accommodation space that accommodates a filter that traps foreign matters which are 10 mm or less in size contained in water flowing through the recovery water passage, and
the impeller passage pressurizes water taken in from the first water intake opening and ejects the water from the first discharge opening.

2. The personal watercraft according to claim 1, wherein:
the second water intake opening is disposed on a bottom surface of the hull.

3. The personal watercraft according to claim 1, further comprising:
an engine that is accommodated inside the hull and generates a driving force,
wherein the recovery water passage at least partially includes a cooling passage for cooling the engine.

4. The personal watercraft according to claim 1, wherein:
the recovery water passage includes a first part having a cross-sectional area and a second part having a cross-sectional area larger than the cross-sectional area of the first part,
the first part is disposed on at least one of an upstream side and a downstream side of the second part, and
the filter accommodation space is disposed in the second part.

5. The personal watercraft according to claim 1, wherein:
the filter has a surface area larger than a cross-sectional area of the filter accommodation space.

6. The personal watercraft according to claim 1, wherein:
the filter includes a primary filter and a secondary filter disposed on a downstream side of the primary filter,
the secondary filter is finer in mesh than the primary filter, and
the primary filter is higher in rigidity than the secondary filter.

7. The personal watercraft according to claim 6, wherein:
the secondary filter is attachable/detachable to/from the primary filter.

8. The personal watercraft according to claim 1, further comprising:
a sensor that detects a degree of clogging of the filter; and
a notifier that notifies a detection result of the sensor.

9. The personal watercraft according to claim 1, further comprising:
an opening/closing door on the ship body, the opening/closing door being disposed at a position where an arrangement place of the filter accommodation space in the recovery water passage can be accessed.

10. The personal watercraft according to claim 1, further comprising:
an access passage having an opening below a driver boarding part and communicating with the filter accommodation space.

11. The personal watercraft according to claim 1, further comprising:
an access passage having an opening behind a driver seat and communicating with the filter accommodation space.

12. The personal watercraft according to claim 1, wherein:
the filter includes a mesh roughness capable of trapping microplastics contained in water as the foreign matters.

13. The personal watercraft according to claim 1, wherein:
the recovery water passage is formed independently of a propulsion mechanism of the personal watercraft.

14. The personal watercraft according to claim 1, wherein:

the filter traps foreign matters which are 5 mm or less in size.

15. The personal watercraft according to claim 14, wherein:

the filter traps foreign matters which are 0.1 mm or greater in size.

16. The personal watercraft according to claim 1, wherein:

the filter traps foreign matters which are 0.05 mm or greater in size.

\* \* \* \* \*